United States Patent [19]

Bowlin

[11] Patent Number: 5,246,333
[45] Date of Patent: Sep. 21, 1993

[54] AUTOMATIC STICK LAYING APPARATUS

[76] Inventor: William P. Bowlin, 9372 Bowlin Dr., Shreveport, La. 71129

[21] Appl. No.: 733,665

[22] Filed: Jul. 22, 1991

[51] Int. Cl.$^5$ .............................................. B65G 57/18
[52] U.S. Cl. ................................ 414/789.5; 414/786; 414/793.6; 414/794.3
[58] Field of Search .................. 414/789.5, 786, 793.6, 414/794.3

[56] References Cited

U.S. PATENT DOCUMENTS

| | | | |
|---|---|---|---|
| 2,928,559 | 3/1960 | Mosely | 414/789.5 |
| 3,352,434 | 11/1967 | Zuercher | 414/789.5 |
| 3,823,834 | 7/1974 | Rysti | 414/789.5 |
| 4,144,976 | 3/1979 | Rysti | 414/789.5 |
| 4,229,133 | 10/1980 | Johnson | 414/789.5 |
| 4,360,303 | 11/1982 | Rysti | 414/789.5 |
| 4,610,360 | 9/1986 | Forslund | 414/789.5 |
| 4,801,233 | 1/1989 | Ritola | 414/789.5 |
| 4,810,152 | 3/1989 | Gillingham | 414/789.5 |
| 4,878,803 | 11/1989 | Whiddon | 414/789.5 |

Primary Examiner—David A. Bucci
Assistant Examiner—Janice Krizek
Attorney, Agent, or Firm—John M. Harrison

[57] ABSTRACT

An automatic stick laying apparatus which is designed to successively position spacing sticks on stacks of lumber for spacing the lumber. In a preferred embodiment the stick laying apparatus includes a fixed frame positioned over stacked tiers of lumber and a carriage assembly mounted on the fixed frame in vertically sliding relationship and fitted with parallel chain channels supporting positioner chains having chain cleats for receiving spacing sticks and positioning the spacing sticks over the respective layers of lumber. Multiple diverter assemblies are positioned in spaced relationship between the chain channels for sequentially displacing the spacing sticks from the spaced chain cleats and depositing the spacing sticks in selectively spaced relationship on the underlying tiers of stacked lumber. In operation, an operator places a spacing stick between adjacent sets of parallel chain cleats, the positioner chains automatically locate the spacing sticks in proper orientation over the lumber, the carriage assembly is lowered to a point immediately over the top layer of lumber, preselected spacing sticks are displaced from the corresponding chain cleats by operation of selected diverter assemblies, the carriage assembly is raised and the diverter assemblies are repositioned.

17 Claims, 5 Drawing Sheets

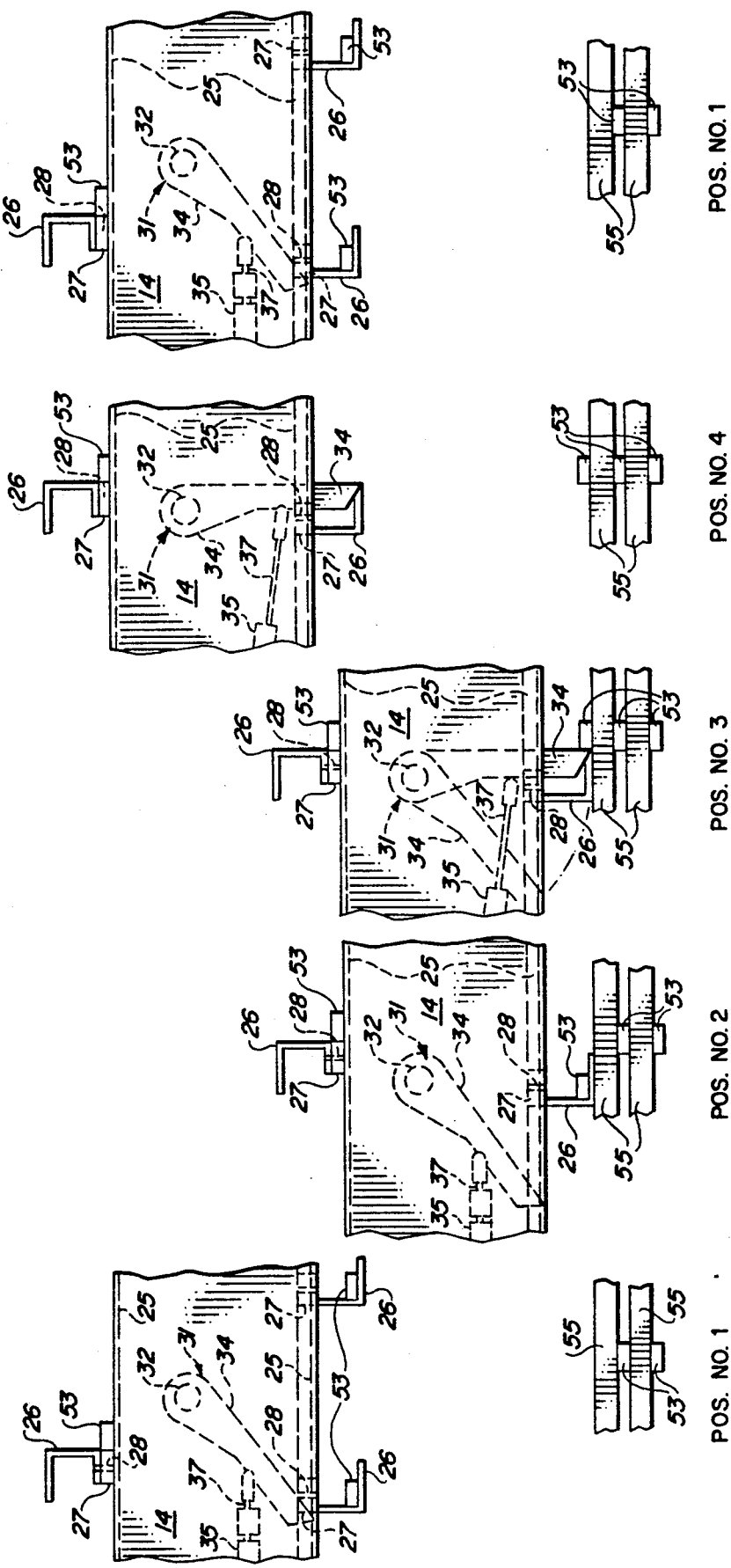

AUTOMATIC STICK LAYING APPARATUS

BACKGROUND OF THE INVENTION

1. Field of the Invention

This invention relates to stacking of wood such as lumber and plywood for drying or other purposes and more particularly, to an automatic stick laying apparatus for positioning spacing sticks on stacked tiers of lumber to provide proper ventilation between the layers of lumber.

At a very early date it became obvious that lumber must be cured prior to use in order to avoid, or at least minimize, warping due to drying. In the early sawmill days "green" lumber was stacked in "ricks" which defined an inverted "V" configuration, where it was air-dried to reduce the moisture content and provide reasonably straight boards for building purposes. With the development of modern sawmills, the rate of processing and drying or curing of "green" lumber increased to the point that it became impractical and unprofitable to stack lumber in this "rick drying" fashion and other techniques were devised to accomplish this purpose. The lumber is now stacked for kiln drying or air drying and the stacking is preferably accomplished in multiple rows and layers by inserting between each tier or layer of boards a number of small spacing sticks which keep the layers spaced and provide ventilating passages through the stack to expose both the upper and lower surfaces of the boards in the stack to the drying air. This procedure serves the purpose of processing a large number of boards of selected size in a relatively short period of time, thereby providing more favorable sawmill economics.

2. Description of the Prior Art

The stacking of lumber has been accomplished by varying apparatus and techniques in modern times. U.S. Pat. No. 2,928,559, dated Mar. 15, 1960, to D. E. Mosely, details a "Lumber Stacker" which includes a mechanism for receiving boards from a source of supply, gathering the boards in layers and depositing the layers on the stack being formed and further including a mechanism for inserting multiple spacing sticks between each layer as the lumber is stacked, to space the layers in tiers. U.S. Pat. No. 3,352,434, dated Nov. 15, 1967, to W. H. Zuercher, details a "Stick Placer Apparatus". The device features a constant feed of sticks on slats from a removable cartridge to insert the stick between successive layers of a stack of lumber and space the lumber for drying. A "Lumber Spacer and Stick Layer" is detailed in U.S. Pat. No. 4,229,133, dated Oct. 21, 1980, to Charles L. Johnson. The lumber spacer automatically separates lumber in parallel alignment, drops spacer sticks on top of the stacked lumber and subsequently stacks more lumber on top of the spaced sticks. U.S. Pat. No. 4,360,303, dated Nov. 23, 1982, to Alpo Rysti, details a "Method and Apparatus for Locating Spacer Strips Between Layers of Timber Packages". The device positions spacer strips between vertically adjacent layers of timber by locating multiple spacer strips supported by distribution members over the top layer of the timber package and activating multiple depressers, which are operatively associated with a frame structure, downwardly to engage respective spacer strips and guide the strips into position on the top layer of the timber package. U.S. Pat. No. 4,610,360, dated Sep. 9, 1986, to H. Forslund, details "Installation for Stacking Piles of Lumber Separated by Sticks". The device includes a number of sink compartments adapted to receive various types of lumber and a lumber conveyor designed to bring lumber from a loading point for unsorted lumber to the sink department. The lumber conveyor also transports sticks to the sink compartment for separation of the lumber in stacked tiers. A "Sticker Placer Apparatus" is detailed in U.S. Pat. No. 4,801,233, dated Jan. 31, 1989, to Edward Ritola. The apparatus includes multiple inclined sticker feed pockets designed to hold facing sticks and adapted to displace one stick at a time from the mouth of the sticker pocket to a variable height of lumber beneath the pocket. U.S. Pat. No. 4,810,152, dated Mar. 7, 1989, to Larry A. Gillingham, et al, details a "Sticker Positioning Apparatus for Use With Lumber Stacker". This apparatus includes an unscrambling conveyor that feeds six spacers from a bulk supply to a crowder feed conveyor, in order to supply sticks to a timed release mechanism. The release mechanism is operated by a cam device to sequentially present the individual spacer sticks in timed fashion to an endless distribution conveyor, where they are moved to the top of a lumber stack and accurately positioned in spaced relationship on the lumber. "A Stick Delivery Apparatus" is detailed in U.S. Pat. No. 4,878,803, dated Nov. 7, 1989, to Wade Q. Whiddon. The device includes a frame, a stick conveyor supported on the frame for movement between a stick supply station and a stick transfer station. The stick conveyor includes structure for transporting sticks from the supply station and for delivering the sticks to the transfer station in spaced, parallel relationship and additional apparatus is provided for replacing the sticks on stacked lumber beneath the frame.

It is an object of this invention to provide an automatic stick laying apparatus for mounting over stacks of lumber, plywood or pressboard and automatically placing spacing sticks on each successive layer of lumber, plywood or pressboard in spaced relationship to facilitate drying or other disposition of the lumber, plywood or pressboard.

Another object of this invention is to provide an automatic stick laying apparatus which is characterized by a fixed frame, a carriage assembly vertically slidably mounted on the fixed frame and fitted with parallel chain channels provided with positioner chains having spaced chain cleats for receiving spacing sticks and further including multiple diverter assemblies attached to the chain channels for sequentially displacing the spacing sticks from the chain cleats and locating the spacing sticks in selectively spaced relationship on successive stacks of lumber located beneath the stick laying apparatus.

Yet another object of this invention is to provide an automatic, computer-operated stick laying apparatus which utilizes a pair of vertically adjustable chain channels carrying positioner chains fitted with spaced chain cleats and a pair of companion advancing chains, for carrying spacing sticks into proper positions above stacked tiers of lumber located beneath the stick laying apparatus and diverter assemblies located between the chain channels for displacing the spacing sticks in a selected spacing on successive layers of lumber to space the layers of lumber for drying purposes.

Still another object of this invention is to provide a method for automatically placing spacing sticks on successive tiers of wood products such as lumber, plywood or the like, which method includes the steps of placing the spacing sticks between parallel sets of spaced cleats attached to a pair of positioner chains located above the lumber, locating the spacing sticks in proper positions over the lumber by operation of the positioner chains, lowering the positioner chains and spacing sticks to a point immediately above the top layer of lumber, causing the spacing sticks to be displaced in a selected sequence from the cleats to the lumber by operation of computerized diverter assemblies, raising the positioner chains and repositioning the diverter assemblies.

SUMMARY OF THE INVENTION

These and other objects of the invention are provided in a new and improved automatic stick laying apparatus and method for laying spacing sticks on successive tiers of lumber, which apparatus includes a fixed frame and a carriage assembly vertically and slidably mounted on the fixed frame above the lumber. The carriage assembly further includes a pair of spaced, parallel chain channels fitted with positioner chains having spaced chain cleats for receiving spacing sticks and advancing chains for seating the spacing sticks on the chain cleats and transporting the spacing sticks to a position over the stacked lumber. Multiple, computer-controlled, cylinder-actuated diverter assemblies, mounted in spaced relationship on the chain channels, operate to sequentially displace the spacing sticks from the chain cleats and deposit the spacing sticks in spaced relationship on the underlying stacks of lumber to space the lumber in stacked tiers.

BRIEF DESCRIPTION OF THE DRAWINGS

The invention will be better understood by reference to the accompanying drawings, wherein:

FIG. 7 is a series of sectional positional views, more particularly illustrating a preferred operation of the automatic stick laying apparatus illustrated in FIGS. 1-6.

DESCRIPTION OF THE PREFERRED EMBODIMENTS

Figure 1:
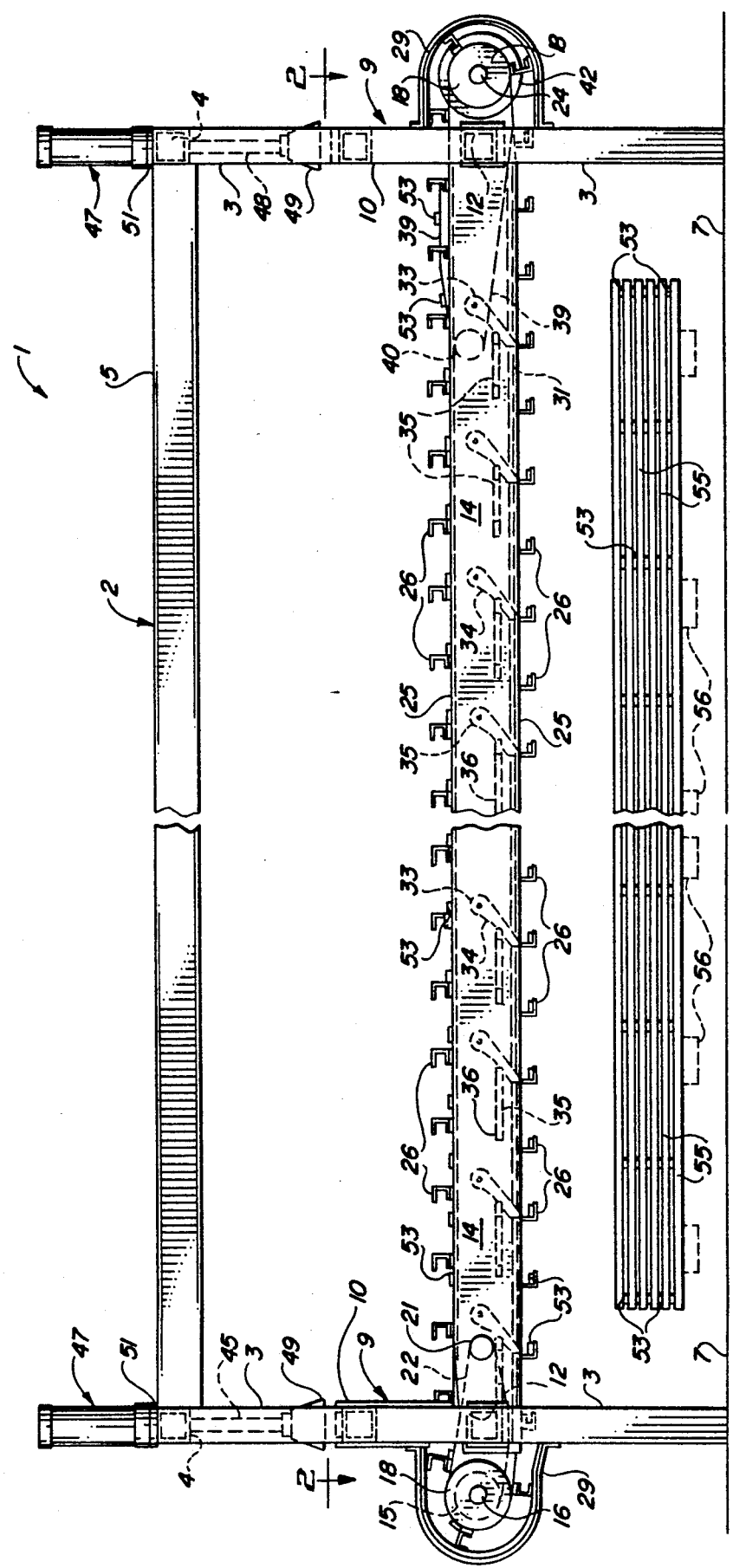
FIG. 1 is a side sectional view of a preferred embodiment of the automatic stick laying apparatus of this invention.
Figure 2:
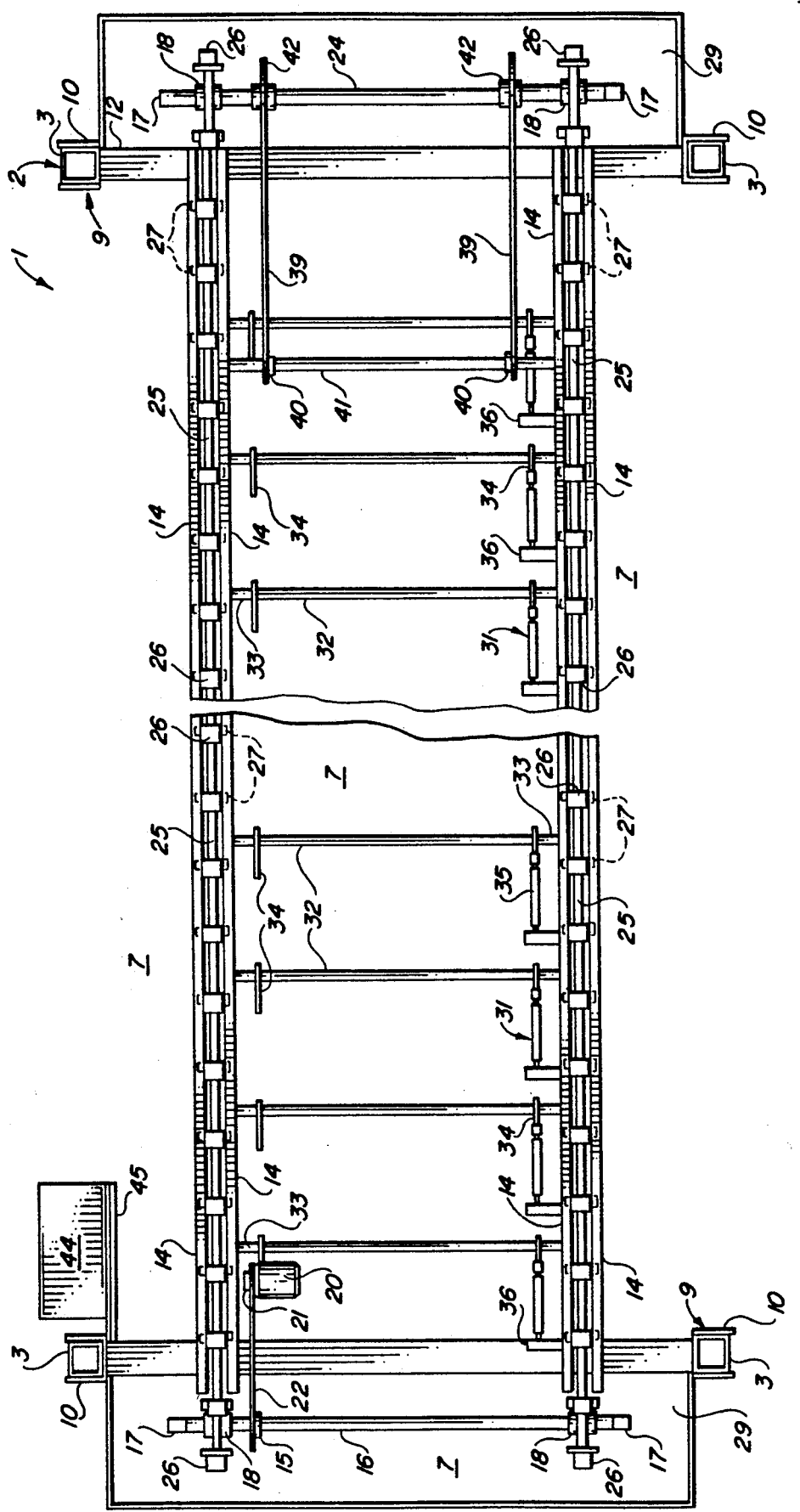
FIG. 2 is a sectional view, taken along line 2—2, of the automatic stick laying apparatus illustrated in FIG. 1.
Figure 5:
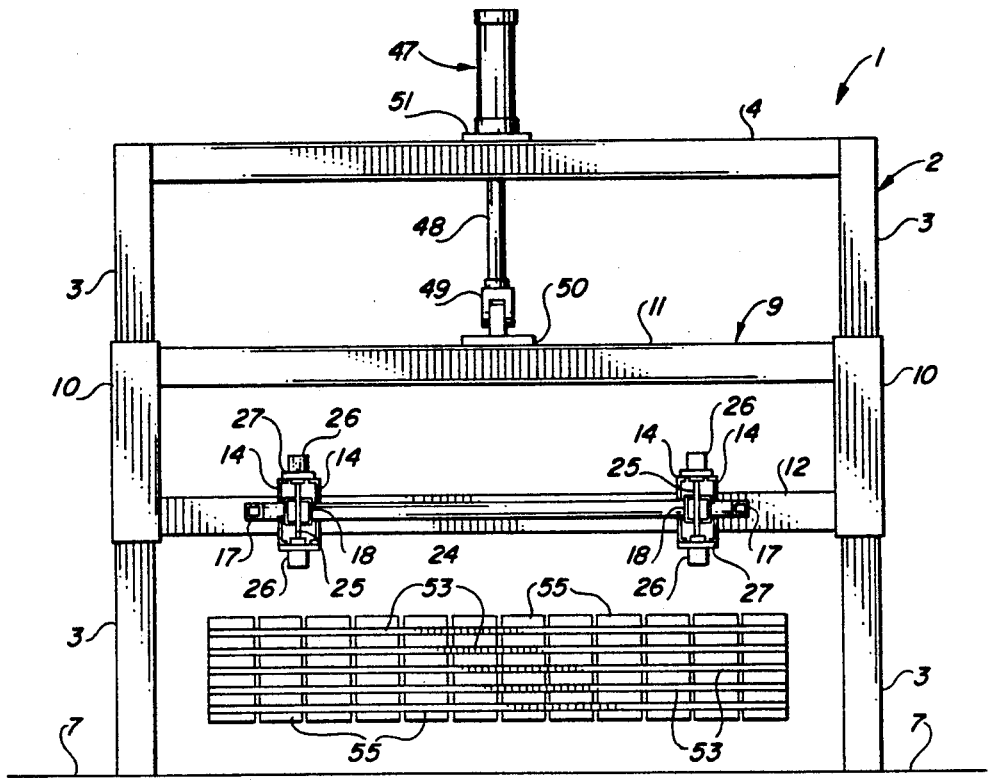
FIG. 5 is an elevation of the idler end of the automatic stick laying apparatus illustrated in FIGS. 1 and 2, with the large advancing chain sprockets removed, for brevity.

Referring initially to FIGS. 1, 2 and 5 of the drawings, in a preferred embodiment the stick laying apparatus of this invention is generally illustrated by reference numeral 1. The stick laying apparatus 1 is characterized by a vertically oriented frame 2, fitted with frame legs 3, frame end braces 4 and frame side braces 5, oriented over stacked tiers of lumber 55, separated by spacing sticks 53 and resting on lumber supports 56. The frame legs 3 and lumber supports 56 are resting on a supporting surface 7, such as concrete, metal or other material. A carriage assembly is generally illustrated by reference numeral 9 and is mounted on the frame legs 3 of the frame 2 in vertically slidable relationship by means of four carriage collars 10. The carriage collars 10 are separated by a pair of horizontal top carriage braces 11 and bottom carriage braces 12, respectively, and two sets of chain channels 14 are disposed in spaced, parallel, facing relationship on the spaced bottom carriage braces 12, as further illustrated in FIGS. 1, 2 and 5. It will be appreciated by those skilled in the art that the chain channels 14 may be welded or otherwise secured to the bottom carriage braces 12, further according to the knowledge of those skilled in the art. However, in a preferred embodiment of the invention openings are cut or otherwise provided in each of the sets of chain channels 14 to accommodate the respective bottom carriage braces 12, as further illustrated in FIG. 1. As further illustrated in FIGS. 1 and 5, a pair of lift cylinders 47 are mounted on the frame end braces 4 by means of cylinder mount brackets 51, respectively, and the corresponding cylinder pistons 48 of the lift cylinders 47 project vertically downwardly and receive a piston clevis 49. Each piston clevis 49 is attached to a clevis bracket 50, bolted or welded to the corresponding top carriage brace 11, for securing the respective cylinder pistons 48 to the top carriage braces 11 in the carriage assembly 9, as further illustrated in FIG. 5. Accordingly, it will be appreciated that the entire carriage assembly 9, including the carriage collars 10, top carriage braces 11, bottom carriage braces 12 and chain channels 14, may be vertically adjusted with respect to the frame 2 and the lumber 55 by operation of the lift cylinders 47, as further hereinafter described.

Referring now to FIGS. 1-6 of the drawings, a drive sprocket 15 is mounted on a drive sprocket shaft 16, disposed between corresponding ends of the chain channels 14 at the drive end of the carriage assembly 9 and the drive sprocket shaft 16 is journalled for rotation in this position by a pair of shaft bearings 17, mounted on a chain guard 29, which is welded, bolted or otherwise secured to the corresponding carriage collars 10, respectively. A pair of chain sprockets 18 are also attached to the drive sprocket shaft 16 in spaced relationship and in alignment with the respective spaces between each of the two sets of chain channels 14, as further illustrated in FIG. 2. A drive motor 20 is disposed between the inboard ones of the two sets of chain channels 14 and is mounted to one of the inboard chain channels 14 by means of a bracket (not illustrated) to align the corresponding drive motor sprocket 21 with the drive sprocket 15 and facilitate connection of the drive sprocket 15 to the drive motor sprocket 21 in driving relationship by means of the drive chain 22. An idler shaft 24 is journalled for rotation at the opposite or idler end of the carriage assembly 9 by means of another pair of shaft bearings 17, mounted on the opposite and corresponding chain guard 29, attached to the opposite carriage collars 10, as further illustrated in FIGS. 1 and 2. A pair of chain sprockets 18 are secured to the idler shaft 24 in spaced relationship between the respective sets of chain channels 14, in alignment with the corresponding chain sprockets 18, mounted on the drive sprocket shaft 16 at the drive end of the carriage assembly 9. A pair of positioner chains 25 are mounted on the respective aligned sets of chain sprockets 18 between the corresponding spaced sets of chain channels 14 and are driven in parallel, spaced relationship by operation of the drive motor 20 and rotation of the drive sprocket shaft 16 and idler shaft 24.

Figure 4:
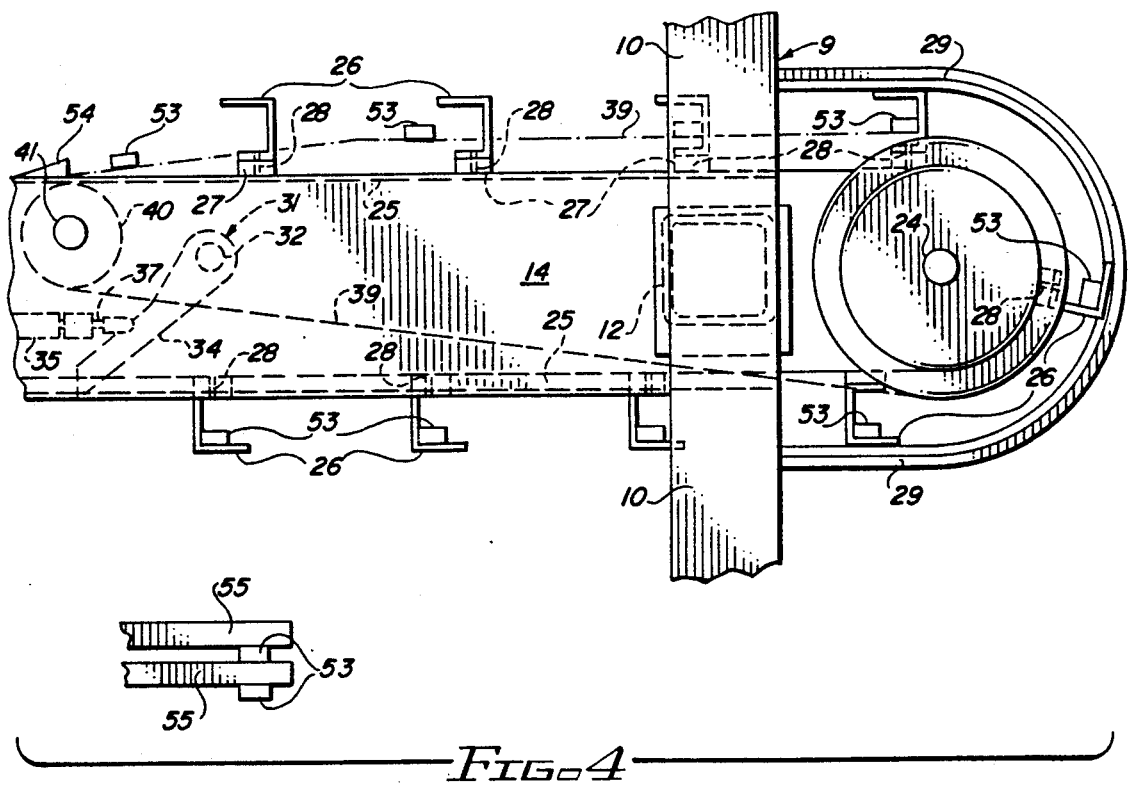
FIG. 4 is a sectional view of the idler end of the automatic stick laying apparatus illustrated in FIGS. 1 and 2.

As further illustrated in FIGS. 1, 2 and 4, in a preferred embodiment of the invention a pair of large advancing chain sprockets 42 are mounted in spaced relationship on the idler shaft 24 and an advancing chain shaft 41 is rotatably extended between the inboard facing ones of the chain channels 14 in spaced, parallel relationship with respect to the idler shaft 24. The advancing chain shaft 41 is fitted with a pair of corresponding small advancing chain sprockets 40, which are aligned, respectively, with the large advancing chain sprockets 42. A pair of advancing chains 39 are mounted in parallel relationship on the corresponding aligned sets of small advancing chain sprockets 40 and large advancing chain sprockets 42, respectively, such that rotation of the idler shaft 24 by operation of the drive motor 20 also effects rotation of the parallel advancing chains 39. The advancing chains 39 are oriented to project above the path of the positioner chains 25 at the idler end of the carriage assembly 9, as illustrated in FIG. 1 and the sizes of the small advancing chain sprockets 40 and large advancing chain sprockets 42 are chosen to cause the advancing chains 39 to move faster than the positioner chains 25, for purposes which will be hereinafter further described.

Figure 3:
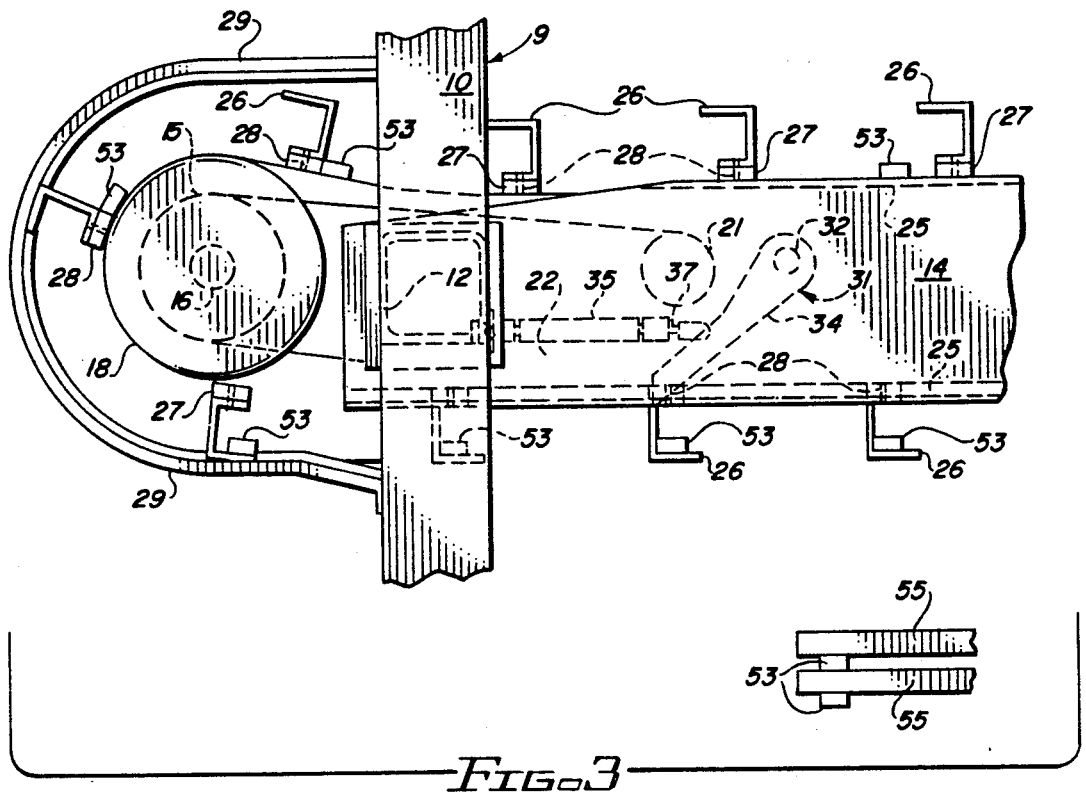
FIG. 3 is a sectional view of the drive end of the automatic stick laying apparatus illustrated in FIGS. 1 and 2.
Figure 6:
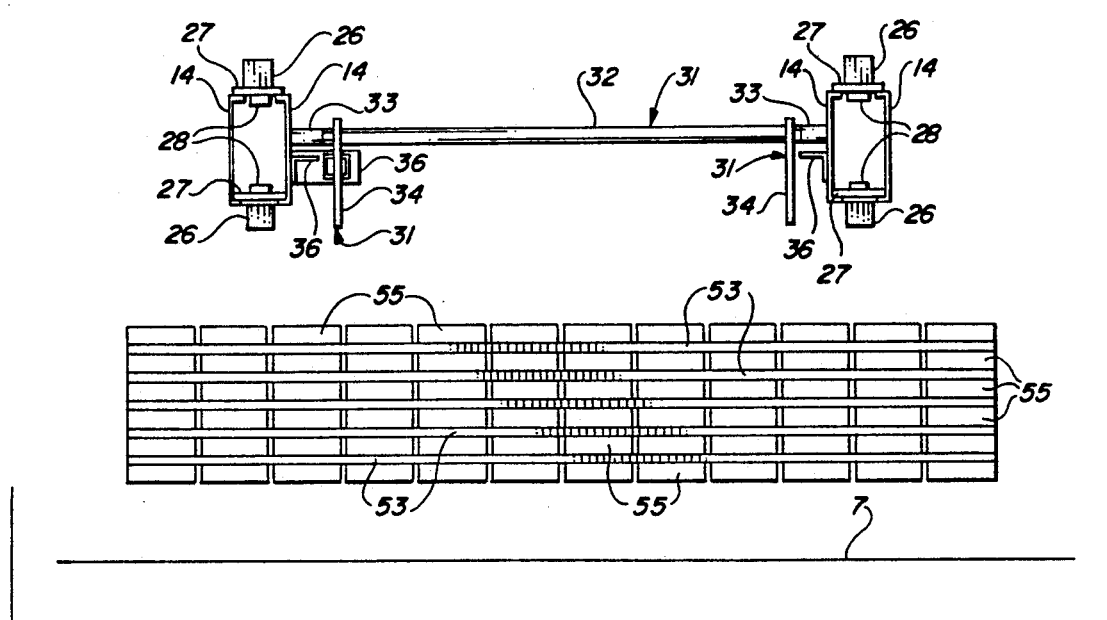
FIG. 6 is an enlarged sectional view of a typical diverter assembly taken along line 6—6 of the automatic stick laying apparatus illustrated in FIG. 2.

In the preferred embodiment of the invention, multiple L-shaped chain cleats 26 are mounted in spaced, parallel aligned sets on each of the positioner chains 25 by means of cleat slides 27 and corresponding cleat bolts 28, as illustrated in FIGS. 3 and 4. The cleat slides 27 may be constructed of any suitable material, but in a most preferred embodiment of the invention are constructed of wood or plastic and are designed to contact the flanges of the parallel chain channels 14 and slide on the horizontal chain channel flanges as the positioner chains 25 traverse the chain channels 14 responsive to operation of the drive motor 20, as illustrated in FIG. 6. The direction of rotation of the positioner chains 25 is clockwise, as indicated by the arrows, when the stick laying apparatus 1 is viewed as indicated in FIGS. 1, 3 and 4.

Referring again to FIGS. 1-4 and 6 of the drawings, multiple, spaced diverter assemblies 31 are located between the respective inboard chain channels 14. Each of the diverter assemblies 31 is characterized by a diverter bar 32, journalled for rotation in spaced diverter bar bearings 33, mounted in the inboard ones of the respective parallel sets of chain channels 14, as illustrated in FIGS. 2 and 6, and a contact leg 34 projecting downwardly from each diverter bar 32, as illustrated in FIGS. 3, 4 and 6. A leg cylinder 35 is mounted on a corresponding cylinder mount bracket 36, attached to one of the inboard chain channels 14 and the leg cylinder piston 37 of each of the leg cylinders 35 is pivotally attached to the contact leg 34 in spaced relationship with respect to the point where the contact leg 34 is attached to the diverter bar 32, respectively. Accordingly, it will be appreciated from a consideration of FIGS. 2, 3, 4 and 6 that operation of the respective leg cylinders 35 in the diverter assemblies 31 to extend the cylinder pistons 37, causes the corresponding contact leg 34 to project downwardly past the horizontal plane of motion of the chain cleats 26 and retraction of the leg cylinder piston 37 effects extension of the respective contact legs 34 upwardly above the plane of motion of the chain cleats 26.

Referring again to FIG. 2 of the drawings, orchestration of the respective diverter assemblies 31 is effected by means of a programmable controller 44, which rests on a computer bracket 45, attached to one of the carriage collars 10 in the carriage assembly 9. It will be appreciated by those skilled in the art that the programmable controller 44 is designed to effect a desired sequential operation of the lift cylinders 47 and the diverter assemblies 31 to properly space the spacing sticks on the respective tiers of lumber 55. Typical of the programmable controllers which may be used to achieve this objective in the automatic stick laying apparatus of this invention is the Allen Bradley SLC 150 programmable controller.

Referring now to FIGS. 4, 5 and 7 of the drawings, the automatic stick laying apparatus of this invention is operated as follows: The drive motor 20 and programmable controller 44 are energized by manipulating one or more control switches (not illustrated). An operator then places a spacing stick 53 between spaced parallel sets of chain cleats 26 on the top segments of the positioner chains 25 as the positioner chains 25 traverse the respective chain channels 14 by operation of the drive motor 20. As the respective spacing sticks 53 and chain cleats 26 approach the advancing chains 39 at the idler end of the carriage assembly 9, they eventually contact a pair of wedges 54, which serve to position the widest dimension of the spacing sticks 53 on the advancing chains 39, which are moving faster than the positioner chains 25. Consequently, the spacing sticks 53 move rapidly forwardly and ultimately engage and rest on the respective parallel sets of chain cleats 26 which face the corresponding spacing stick 53, as illustrated in FIG. 4. Accordingly, by the time each respective parallel set of chain cleats 26 begins to move downwardly at the idler end of the carriage assembly 9, it receives a separate spacing stick 53, as further illustrated in FIG. 4. Parallel spacing sticks 53 then rest on the horizontal flanges of matching sets of chain cleats 26 as the chain cleats 26 and spacing sticks 23 continue to move in a clockwise rotation directly above the lumber 55. During this linear movement of the spacing sticks 53 in a horizontal plane above the lumber 55 as illustrated in FIG. 7, position no. 1, the programmable controller 44 has been programmed to sequentially energize the lift cylinders 47, illustrated in FIG. 5, and lower the carriage assembly 9 to position no. 2 in FIG. 7. The programmable controller 44 then operates preselected and programmed leg cylinders 35 in the diverter assemblies 31 to effect pivotal movement of the respective sets of corresponding contact legs 34, responsive to extension of the leg cylinder pistons 37 from the orientation in position no. 2 to the orientation in position no. 3, illustrated in FIG. 7. This action causes each set of contact legs 34 to engage a corresponding spacing stick 53 in spaced relationship and displace the spacing stick 53 from the horizontal flanges of the parallel sets of chain cleats 26, to the top surface of the top row or tier of lumber 55, as illustrated. The carriage assembly 9 is then raised to position no. 4 by operation of the lift cylinders 47 according to the programming of the programmable controller 44 and the leg cylinder pistons 37 are retracted to again withdraw each respective contact leg 34 back into the orientation illustrated in position no. 1, to start another cycle.

It will be appreciated by those skilled in the art that the automatic stick laying apparatus of this invention may be driven by any fluid-operated system, including pneumatic and hydraulic systems and the like, as desired. Accordingly, no specific operating system has been illustrated, for purposes of brevity, it being understood that the appropriate hydraulic, air or alternative fluid reservoir, pump, hoses, couplings and fittings, as well as appropriate solenoid valves, may be coupled to the respective leg cylinders 35 of the diverter assemblies 31, as well as the lift cylinders 47 which operate the carriage assembly 9, in order to effectuate the purposes of the invention. However, in a preferred embodiment of the invention, a hydraulic system is utilized in combination with solenoid valves to operate both the leg cylinders 35 and the lift cylinders 47 and the appropriate hydraulic fluid reservoir, motor, connecting lines and fittings may be mounted in the carriage assembly 9 according to the knowledge of those skilled in the art, in order to facilitate optimum installation of the stick laying apparatus 1 in an existing lumber stacking operation.

It will be further appreciated by those skilled in the art that the automatic stick laying apparatus may be easily adapted to flat wood product processing and handling, such as may be required in plywood and pressboard mills, and the like. Moreover, because of the design feature which incorporates the advancing chains, irregular spacing sticks may be incorporated for use and all spacing sticks may be inserted between parallel sets of chain cleats with imprecision, without the necessity of precisely locating the spacing sticks on the chain cleats themselves.

While the preferred embodiments of the invention have been described above, it will be recognized and understood that various modifications may be made in the invention and the appended claims are intended to cover all such modifications which may fall within the spirit and scope of the invention.

Having described by invention with the particularity set forth above, what is claimed is:

1. Apparatus for successively positioning sticks on layers of wood, comprising a frame; carriage assembly means vertically slidably carried by said frame; rotatable positioner chain means mounted on said carriage assembly means in substantially horizontal disposition; stick carrying means carried by said positioner chain means in spaced relationship for supporting the sticks and transporting the sticks along a path of travel over the wood in release configuration; and diverter means pivotally mounted on said carriage assembly means for selectively pivoting into the path of travel of the sticks and displacing the sticks from said stick carrying means onto the wood.

2. The apparatus of claim 1 wherein said carriage assembly means further comprises a plurality of carriage collars slidably carried by said frame and two sets of chain channels carried in horizontal orientation by said carriage collars and wherein said positioner chain means and said diverter means are carried by said chain channels, and at least one lift cylinder means carried by said frame, with the lift cylinder piston of said lift cylinder means attached to said carriage assembly means for raising and lowering said carriage collars on said frame.

3. The apparatus of claim 1 further comprising rotatable advancing chain means carried by said frame, said rotatable advancing chain means adapted to travel faster than said positioner chain means and move the sticks from said positioner chain means into engagement with said stick carrying means.

4. The apparatus of claim 1 wherein said carriage assembly means further comprises a plurality of carriage collars slidably carried by said frame and two sets of chain channels carried in horizontal orientation by said carriage collars and wherein said positioner chain means and said diverter means are carried by said chain channels and further comprising rotatable advancing chain means carried by said frame and extending above said positioner chain means parallel to the path of travel of the sticks, said rotatable advancing chain means adapted to travel faster than said positioner chain means and move the sticks from said positioner chain means into engagement with said stick carrying means.

5. The apparatus of claim 1 further comprising programmable controller means in close proximity to said frame, said programmable controller means electrically connected to said diverter means for orchestrating operation of selected ones of said diverter means and locating the sticks on the wood in a selected spacing.

6. The apparatus of claim 5 further comprising carriage assembly means vertically slidably carried by said frame and wherein said positioner chain means and said diverter means are mounted on said carriage assembly means.

7. The apparatus of claim 6 wherein said carriage assembly means further comprises a plurality of carriage collars slidably carried by said frame and two sets of chain channels carried in horizontal orientation by said carriage collars and wherein said positioner chain means and said diverter means are carried by said chain channels, and at least one lift cylinder means carried by said frame, with the lift cylinder piston of said lift cylinder means attached to said carriage assembly means for raising and lowering said carriage collars on said frame.

8. The apparatus of claim 5 further comprising rotatable advancing chain means carried by said frame and extending above said positioner chain means parallel to the path of travel of the sticks, said rotatable advancing chain means adapted to travel faster than said positioner chain means and move the sticks from said positioner chain means into engagement with said stick carrying means.

9. The apparatus of claim 8 further comprising a plurality of carriage collars slidably carried by said frame and two sets of chain channels carried in horizontal, parallel orientation by said carriage collars and wherein said positioner chain means and said diverter means are carried by said chain channels.

10. Apparatus for successively positioning spacer sticks on layers of stacked lumber, comprising a fixed frame; a carriage assembly vertically slidably carried by said frame, said carriage assembly disposed over the lumber; a pair of rotatable positioner chains disposed in spaced, substantially parallel, horizontal relationship on said carriage assembly; a plurality of chain cleats carried by said positioner chains in parallel, spaced sets for receiving the sticks and transporting the sticks over the lumber; drive means mounted on said carriage assembly and operably connected to said positioner chains in driving relationship; a plurality of fluid-operated stick diverter means pivotally carried by said carriage assembly in spaced relationship between said positioner chains; and programmable controller means carried by said carriage assembly and electrically connected to said stick diverter means, whereby said carriage assembly is lowered over the lumber and selected ones of said stick diverter means are pivotally operated to engage corresponding ones of the spacer sticks and reposition the spacer sticks from said chain cleats onto the lumber in a preselected spacing, responsive to operation of said programmable controller means.

11. The apparatus of claim 10 further comprising a pair of rotatable advancing chains carried by said carriage assembly in spaced relationship with respect to each other, said rotatable advancing chains adapted to travel faster than said positioner chains and receive the sticks from said stick carrying means on said positioner chains, for relocating the sticks on said chain cleats before the sticks are suspended in said release configuration over the lumber.

12. The apparatus of claim 10 further comprising at least one fluid lift cylinder carried by said frame and electrically connected to said programmable controller means, with the lift cylinder piston of said lift cylinder attached to said carriage assembly, for raising and lowering said carriage assembly responsive to operation of said lift cylinder and said programmable controller means.

13. The apparatus of claim 10 further comprising:
(a) a pair of rotatable advancing chains carried by said carriage assembly in spaced relationship with respect to each other, said rotatable advancing chains adapted to travel faster than said positioner chain means and move the sticks from said positioner chain means into engagement with said stick carrying means; and
(b) at least one fluid lift cylinder carried by said frame and electrically connected to said programmable controller means, with the lift cylinder piston of said lift cylinder attached to said carriage assembly, for raising and lowering said carriage assembly responsive to operation of said lift cylinder and said programmable controller means.

14. A method of successively applying spacing sticks in spaced relationship on tiers of lumber comprising the steps of placing spacing sticks between successive sets of chain cleats attached to a pair of positioner chains disposed over the lumber; locating the spacing sticks above the lumber by rotation of the position chains; lowering said positioner chains over the lumber; pivoting diverter assemblies to displace the spacing sticks from the chain cleats to the lumber in selectively spaced relationship; repivoting the diverter assemblies and raising the positioner chains after displacing the spacing sticks.

15. The method according to claim 14 further comprising the step of advancing the spacing sticks into contact with said chain cleats by operation of a pair of advancing chains travelling faster than said positioner chains.

16. The method according to claim 14 further comprising the step of orchestrating the pivoting operation of said diverter assemblies by means of a programmable controller.

17. The method according to claim 14 further comprising the steps of:
(a) advancing the spacing sticks into contact with said chain cleats by operation of a pair of advancing chains traveling faster than said positioner chains; and
(b) orchestrating the pivoting of said diverter assemblies by means of a programmable controller.

* * * * *